(12) United States Patent
Schulz

(10) Patent No.: US 10,871,096 B1
(45) Date of Patent: Dec. 22, 2020

(54) REACTIVE CYCLIC INDUCTION SYSTEM AND METHOD FOR REDUCING POLLUTANTS IN MARINE DIESEL EXHAUST

(71) Applicant: Walter Schulz, Bristol, RI (US)

(72) Inventor: Walter Schulz, New Bedford, MA (US)

(73) Assignee: STEG TECHNOLOGY, INC., Bristol, RI (US)

( * ) Notice: Subject to any disclaimer, the term of this patent is extended or adjusted under 35 U.S.C. 154(b) by 0 days.

(21) Appl. No.: 16/860,056

(22) Filed: Apr. 27, 2020

(51) Int. Cl.
*F01N 3/20* (2006.01)
*F01N 3/01* (2006.01)

(52) U.S. Cl.
CPC ............... *F01N 3/206* (2013.01); *F01N 3/01* (2013.01); *F01N 3/2013* (2013.01); *F01N 2570/04* (2013.01); *F01N 2570/12* (2013.01); *F01N 2570/14* (2013.01); *F01N 2590/02* (2013.01); *F01N 2610/01* (2013.01); *F01N 2610/102* (2013.01); *F01N 2610/1433* (2013.01)

(58) Field of Classification Search
CPC .......... F01N 3/206; F01N 3/2013; F01N 3/01; F01N 2590/02; F01N 2570/12; F01N 2610/01; F01N 2610/102; F01N 2610/1433; F01N 2570/04; F01N 2570/14
See application file for complete search history.

(56) References Cited

U.S. PATENT DOCUMENTS

2020/0116062 A1\* 4/2020 Koevoet ............... F01N 3/2066

\* cited by examiner

*Primary Examiner* — Brandon D Lee
(74) *Attorney, Agent, or Firm* — McInnes & McLane, LLP

(57) ABSTRACT

A system and method for reduction of Nitrogen Oxide emissions from marine engines by converting Nitrogen Oxide into Nitrogen is disclosed. The modular reactive cyclic induction apparatus connects to the exhaust of a conventional diesel marine engine and uses air pressure and the sodium chloride in seawater to create a molecular reaction to break down Nitrogen Oxide into Nitrogen by use of an induction apparatus. The system can also include a loop for removing Carbon Dioxide through electrolysis, and removes other environmental pollutants as well, including for example Sulphur oxides, hydrocarbons, and particulate matter during the process.

21 Claims, 11 Drawing Sheets

REACTIVE CYCLIC INDUCTION SYSTEM AND METHOD FOR REDUCING POLLUTANTS IN MARINE DIESEL EXHAUST

TECHNICAL FIELD

This disclosure relates to a system and method for reduction of Nitrogen Oxide emissions from marine engines by converting Nitrogen Oxide into Nitrogen, and more specifically, to a modular reactive cyclic induction apparatus that connects to the exhaust of a conventional diesel marine engine and uses air pressure and the sodium chloride in seawater to create a molecular reaction to break down Nitrogen Oxide into Nitrogen. The system and method cycle the exhaust fumes through one or more induction apparatus, without the use of ozone, to reduce Nitrous oxide emissions from marine exhausts. The system can also include a loop for reducing Carbon Dioxide emissions through electrolysis and emulsification, and removes other environmental pollutants as well, including for example Sulphur Oxides, particulate matter, and hydrocarbons during the process. The system for carrying out the method is modular, so that it can be readily customized to the size of the propulsion engines, generators and configuration of an engine room, such as those found in commercial vessels, ferries and luxury yachts, without sacrificing space.

BACKGROUND

The term "NOx" refers to mono-nitrogen oxides, in particular NO (nitric oxide) and NO2 (nitrogen dioxide). NOx is produced during combustion, especially at high temperatures, and is known to cause a variety of environmental problems. In the past NOx emissions in heavy-duty diesel-powered vehicles, for example diesel trucks, have been reduced by techniques such as selective catalytic reduction (SCR).

SCR of NOx is normally used for lean burn engine exhaust and involves the addition of reducing agents, such as urea. This technique is undesirable for luxury yachts since it requires large sacrifices of valuable space and utilizes dangerously high temperatures. The optimum temperature ranges for SCR vary from 480° F. to 800° F. (250° C. to 427° C.) and are not effective at lower temperatures, e.g. at temperatures below 250° C. Such high temperatures are potentially dangerous in engine rooms of marine vessels where space is confined and limited. Constant air flow is necessary with SCR because of the heat. In addition, reducing agents such as urea need to be stocked in sufficient amounts, which increases the weight of the ship considerably and results in higher emissions, including higher $CO_2$ emissions, which are not addressed by SCR and is undesirable from an environmental point of view. SCR is also prohibitively expensive with the additional cost for an average 100 foot luxury yacht with twin engines and two generators being estimated by the National Marine Manufacturer's Association at $110,000 per engine, plus another $85,000 per generator, i.e. over $400,000 when installed.

In larger ships, greater than 400 feet, stacked scrubbers are utilized to reduce NOx emissions, but these are not suitable for smaller ships, i.e. vessels under 250'/76m such as luxury yachts, ferries, and other commercial vessels. One type of stacked scrubber is a wet scrubber. Inside an open-loop wet scrubber, the scrubbing liquid used is generally sea water with chemical additives. The most commonly used additive is caustic soda. Scrubbing liquid is sprayed into the exhaust gas stream through nozzles to distribute it effectively. In most scrubbers the design is such that the scrubbing liquid moves downstream, however, scrubbers with an upstream movement of scrubbing liquids are available as well. One such stacked wet scrubber is illustrated in FIG. 1 Prior Art. As will be appreciated, such scrubbers or too large for use in yachts under approximately 250 feet because of their size and the amount of chemical additives needed to make the system work effectively.

Other techniques, such as those disclosed in U.S. Pat. No. 9,533,256 and WO 2018222035 utilize an ozone reaction as an oxidizing compound to reduce NOx emissions. However, the use of Ozone carries its own ramifications as ozone is known to be harmful to humans, animals and the environment. As a result, there are many restrictions regarding the use of Ozone, which can make it difficult to produce and utilize in a safe and cost-effective manner.

Another known NOx abatement technique comprises exhaust gas recirculation (EGR). This requires modifications of the engines and corresponding extensive development and testing. These EGR modified engines are not generally suitable for acceptable NOx reduction to meet current and new NOx emissions regulations and require additional SCR exhaust treatment to be compliant. The use of EGR in luxury yachts and similar size vessels, where space is confined and limited, along with the cost of replacing existing engines makes it an impracticable choice.

As a result, these prior art techniques have not been successfully applied for the treatment of exhaust gases from marine engines, specifically commercial vessels and yachts that are too small to utilize stacked scrubbing.

The International Maritime Organization (IMO), an agency of the United Nations which was formed to promote maritime safety, has developed new regulations to reduce NOx emissions. The NOx emission limits of Regulation 13 of MARPOL Annex VI apply to each marine diesel engine with a power output of more than 130 kW installed on a vessel. NOx emission limits are set for diesel engines depending on the engine maximum operating speed (n, rpm). In recent years the maximum allowable NOx emissions have been gradually decreased from Tier I (for ships constructed after 1 Jan. 2000): 9.8 g NOx per kWh, via Tier II (for ships constructed after 1 Jan. 2011): 7.7 g NOx per kWh, to Tier III (for ships constructed after 1 Jan. 2016): 2 g NOx per kWh. Tier IV legislation is expected, in which the maximum emission is as low as 0.4 g NOx per kWh. The indicated maximum emissions are for engines operating at 2000 rpm. Furthermore Regulation (EU) 2016/1628 imposes new emissions limits, referred to as "Stage V," to reduce the emissions of air pollutants, including NOx.

SUMMARY

The removal of environmental pollutants from marine exhaust of diesel engines is an ongoing challenge in the maritime industry. As the adverse effects of contaminants such as NOx and $CO_2$ become more well know and widespread, emissions regulations in the maritime industry are becoming more restrictive. For luxury yachts and other vessels of a certain length, where space is at a premium and stacked SCR scrubbers are not a realistic solution, the reduction of NOx emissions and other pollutants in a practical and cost-effective manner has been challenging. A method and system for reducing pollutants in marine diesel exhaust to meet more stringent standards, which is economical, can interface with existing diesel engines, compact, and readily customized to any space is therefore desirable.

A modular reactive-cyclic induction ("RCI") system that connects to the exhaust of a conventional diesel marine engine, without modification to the engine or the use of ozone, which uses air pressure and the sodium chloride in seawater to create a molecular reaction to break down Nitrogen Oxide into Nitrogen is disclosed herein.

The system connects directly to the exhaust of existing engines that activates the system and includes controls to prevent back pressure from building, pressurized air is utilized within the system, including an air pressurized filter device to remove Sulfur Oxides ("SOx"), Hydrogen Carbons ("HC"), and Particulate Matter ("PM"), and at least one induction apparatus which cycles and emulsifies the exhaust fumes therethrough to expose toxic NOx to seawater to break down the molecular structure of NOx into harmless nitrogen (NO). The system is modular, so that it can be readily customized to the configuration of an engine room, such as those found in commercial vessels and luxury yachts, without sacrificing space. In one embodiment, the induction apparatus utilized provides static mixing of the seawater and NOx.

In one embodiment, the at least one induction apparatus is also utilized to reduce $CO_2$ emissions from the exhaust either contemporaneously or asynchronously with the breakdown of the NOx. The induction apparatus includes an electrolyzer having an anode and cathode along with calcium oxide and other compounds mixing with seawater as the electrolyte through which the $CO_2$ is passed.

If the induction apparatus is utilized to reduce $CO_2$, an exhaust manifold with a heating coil may be provided in one embodiment to heat the seawater that is circulated through the manifold to increase the temperature of the seawater above about 270° F. when it enters the induction apparatus. Alternately, or in addition to an exhaust manifold, the induction apparatus itself may include a manifold to heat the seawater circulating therein, whether for NOx or $CO_2$ reduction. The induction apparatus may also include loop recirculation to insure full cycle exposure.

BRIEF DESCRIPTION OF THE DRAWINGS

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments and are incorporated in and constitute a part of this specification but are not intended as a definition of the limits of any particular embodiment. The figures, together with the remainder of the specification, serve only to explain principles and operations of the described and claimed aspects and embodiments, but are not to be construed as limiting embodiments. In the figures, each identical or nearly identical component that is illustrated in various figures is represented by a like numeral. For purposes of clarity, not every component may be labeled in every figure.

DETAILED DESCRIPTION OF THE ILLUSTRATIVE EMBODIMENTS

The examples of the system and method discussed herein are not limited in application to the details of construction and the arrangement of components set forth in the following description or illustrated in the accompanying drawings. It will be understood to one of skill in the art that the system and method is capable of implementation in other embodiments and of being practiced or carried out in various ways. Examples of specific embodiments are provided herein for illustrative purposes only and are not intended to be limiting. Also, the phraseology and terminology used herein is for the purpose of description and should not be regarded as limiting. Any references to examples, embodiments, components, elements or acts of the system and method herein referred to in the singular may also embrace embodiments including a plurality, and any references in plural to any embodiment, component, element or act herein may also embrace embodiments including only a singularity (or unitary structure). References in the singular or plural form are not intended to limit the presently disclosed system and device, its components, acts, or elements. As used herein, the singular forms "a", "an" and "the" are intended to include the plural forms as well, unless the context clearly indicates otherwise. The use of "including," "comprising," "comprises," "having," "containing," "involving," and variations thereof in the specification is meant to encompass the items listed thereafter and equivalents thereof but do not preclude the presence or addition of one or more other features or items. References to "or" may be construed as inclusive so that any terms described using "or" may indicate any of a single, more than one, and all of the described terms. As also used herein, the term "NOx" refers to mono-nitrogen oxides, in particular NO (nitric oxide) and NO2 (nitrogen dioxide). As also used herein, certain terminology such as for example saltwater and seawater, may be used interchangeably to refer to the same thing. As also used herein, the reference to "sufficient" as it relates to a reduction in NOx emission reduction, means a reduction that meets the standards set by IMO, as set forth in the background, or by approximately 75-90% of the emissions from the diesel engine, whichever is lesser.

Figure 1:
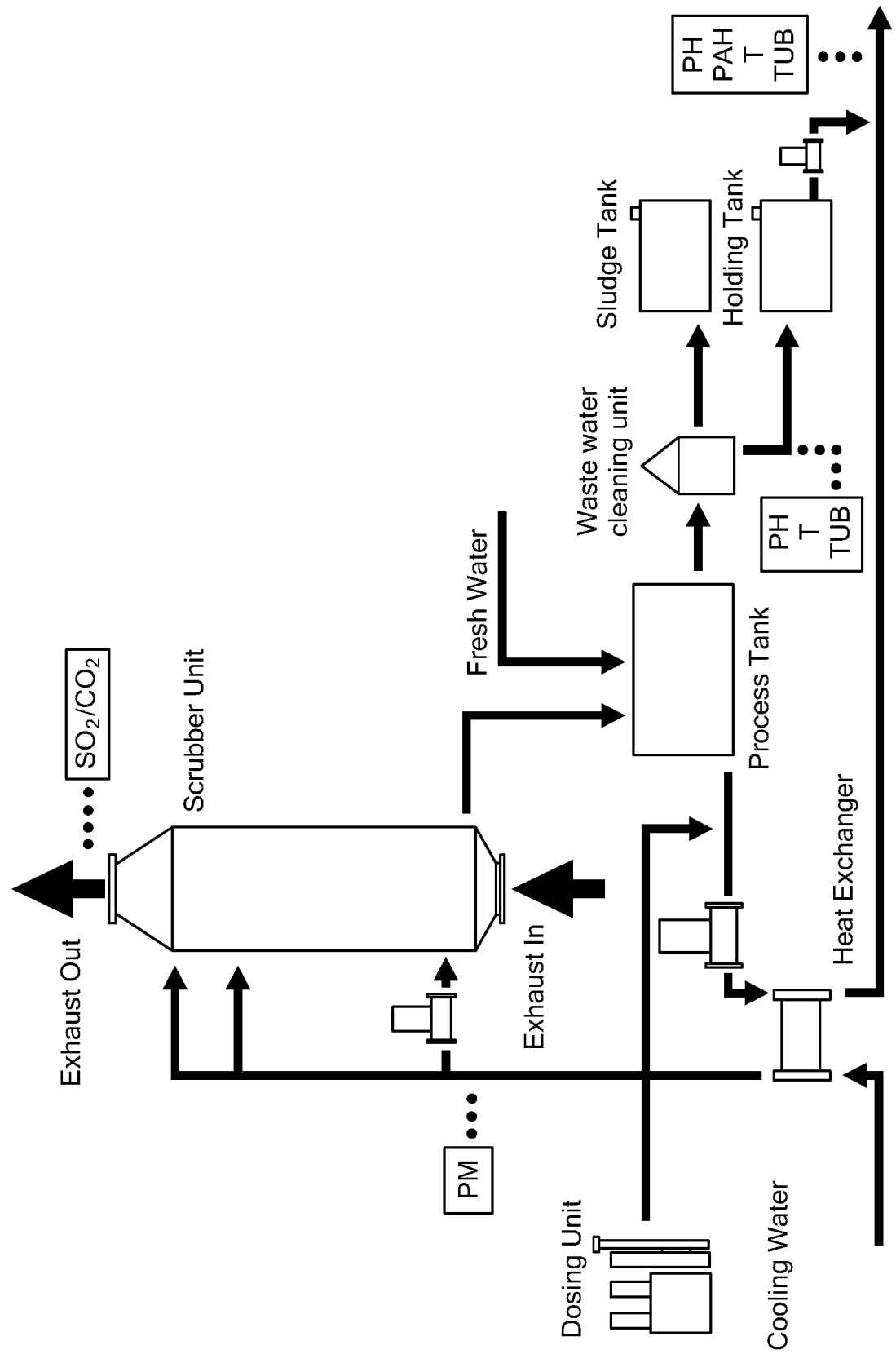
FIG. 1 is schematic of a representative prior art stacked wet scrubber.
Figure 2:
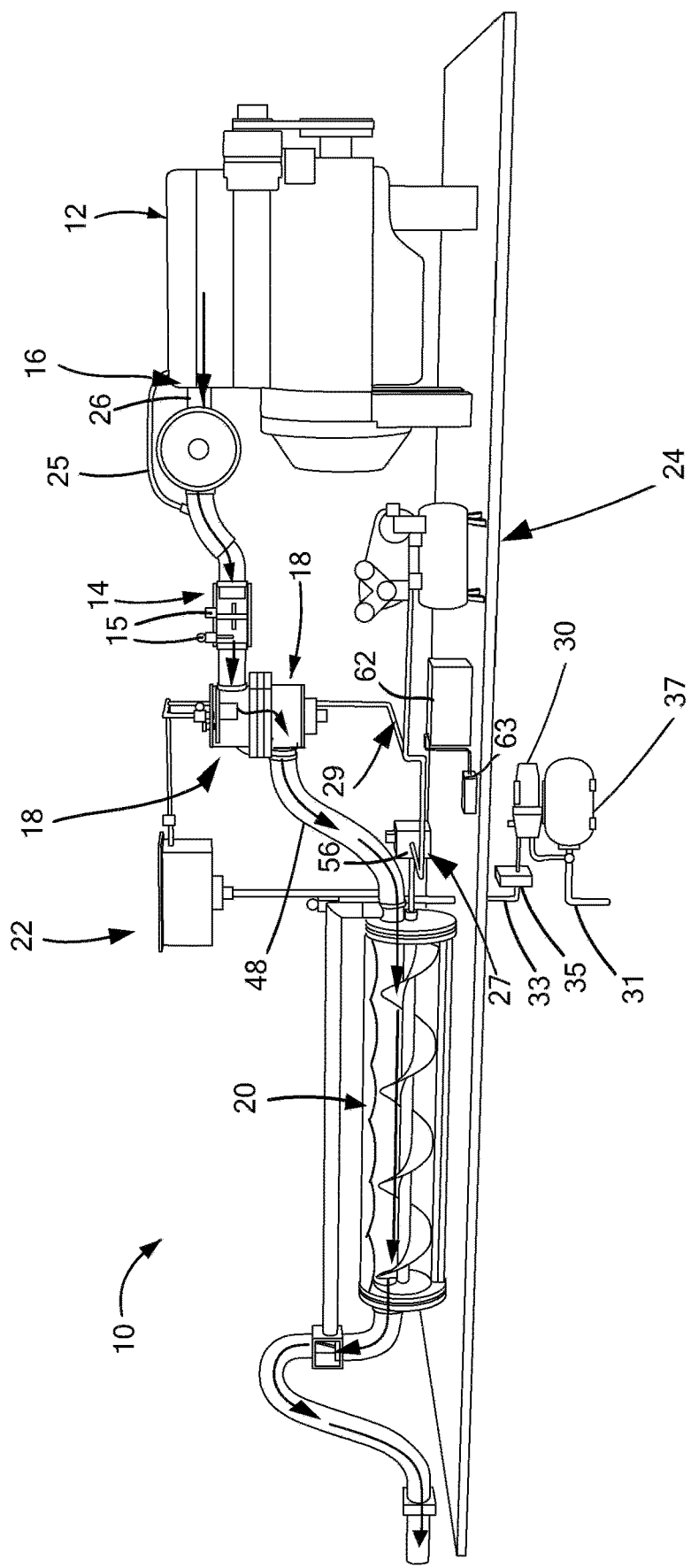
FIG. 2 is a perspective view of a modular reactive-cyclic induction system for breaking down Nitrogen Oxide into Nitrogen in accordance with a first embodiment.

Referring initially to FIG. 2, the present disclosure is directed to a modular, reactive-cyclic induction method and system 10 for breaking down NOx pollutants from a marine exhaust diesel engine 12 into Nitrogen for discharge back into the sea. The system utilizes a combination of pressurized seawater, air pressure and a churning induction apparatus in order to break down the NOx. In the present embodiment, the system 10 connects to the exhaust 16 of the diesel engine 12 and includes a shuttle mechanism 14 that operates to prevent back pressure within the system, an air pressurized filter unit 18, and an induction apparatus 20 that mixes the seawater with exhaust fumes and cycles the two by churning. Air compressor 24 driven by motor 27 pumps pressurized air through the system through a plurality of air lines 29 in order to drive the exhaust. Seawater is introduced into system 10 via inlet tube 31 and by pump 30, which pumps the seawater through one or more water lines 33. A tank 37 holds the seawater while a pressure/volume regulator 35 monitors the seawater pressure within the system 10 for distribution from the tank 37, as needed.

The system 10 is connected to the exhaust 16 of diesel engine 12 by one end of flexible hose 26 and includes engine seawater cooling discharge 25 tube. The engine does not need to be modified in any way and there is no connection into any of the engine systems, only to the exhaust. The other end of flexible hose 26 is connected to shuttle mechanism 14 in the present embodiment. Upon exiting the engine, the exhaust and any engine seawater cooling discharge travel through flexible hose 26 and enter shuttle mechanism 14.

Figure 3:
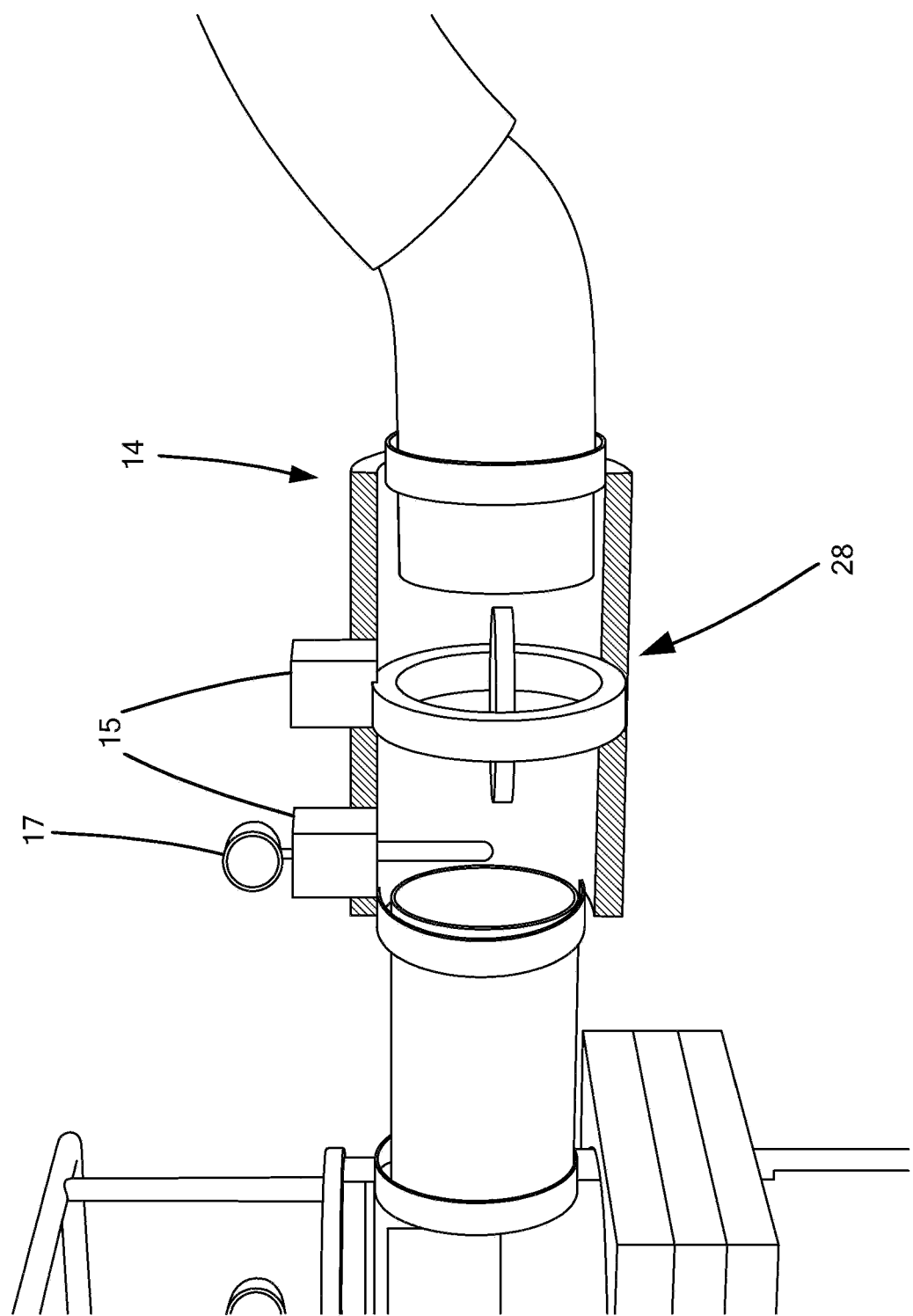
FIG. 3 is an enlarged front perspective view in partial cross-section of a shuttle mechanism of the reactive-cyclic induction system of FIG. 2.
Figure 4:
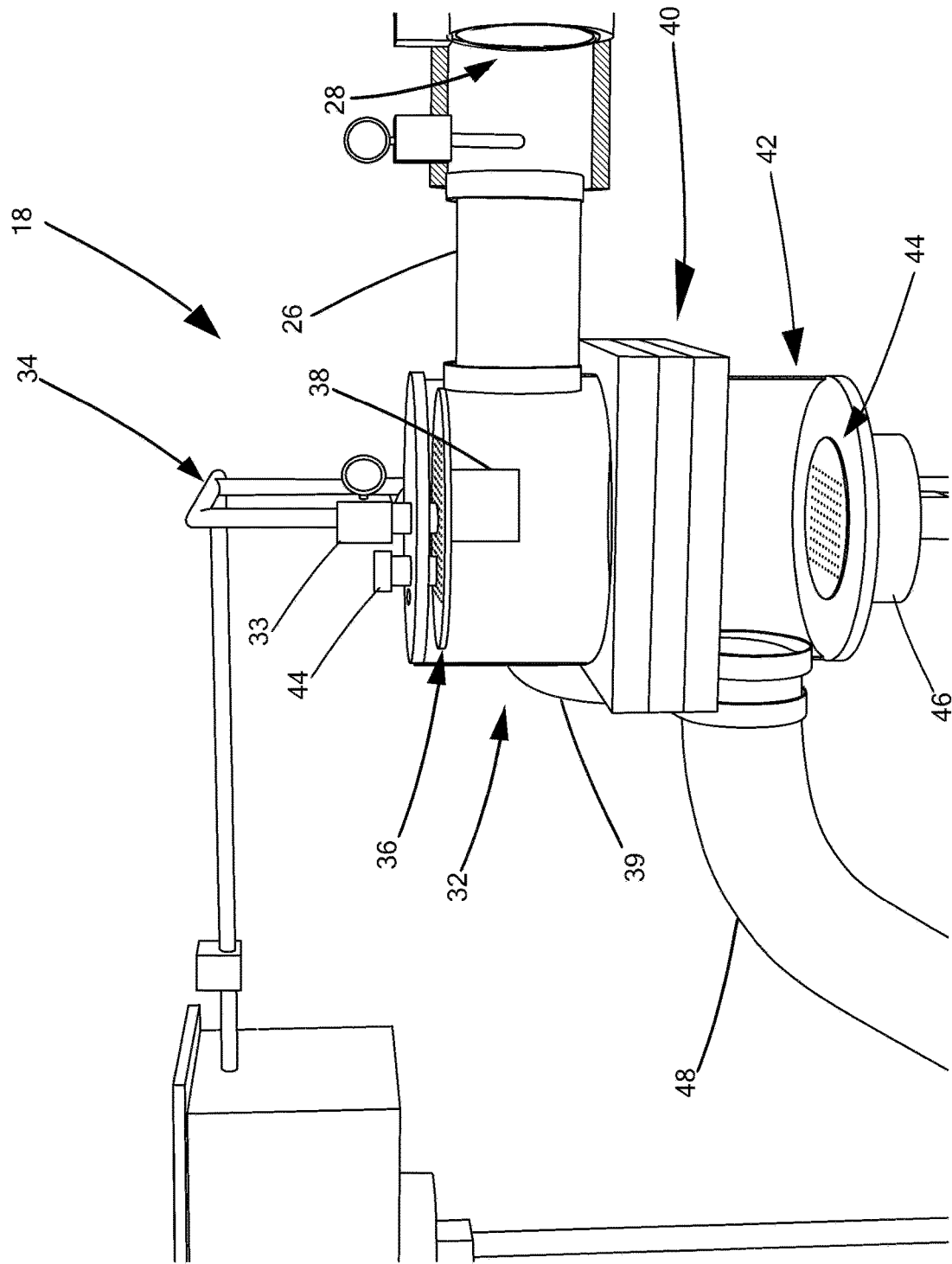
FIG. 4 is an enlarged front perspective view in partial cross-section of a filter device of the reactive-cyclic induction system of FIG. 2.

As best shown in FIG. 3, shuttle mechanism 14 may include a switch or valve 28 movable between closed (off) position and an open (on) position. An exemplary butterfly valve or switch is shown, but could be replaced with any of a variety of valves, as would be known to those of skill in the art. When the engine 12 is operating and the pressure from the exhaust is high enough, the valve 28 moves into the open position as shown in FIG. 3. Also included in shuttle mechanism 14 are pressure monitors 15 and gauge 17 that monitor the air and seawater pressure within the system. When the pressure monitor is below a certain acceptable level it signals the valve 28 to close as shown in FIG. 4. Closing valve 28 prevents back pressure from building within the system that could damage the engine through the introduction of seawater into the engine. Gauge 17 provides a visual indication of the pressure in the system in case manual intervention becomes necessary. After exiting the engine, the exhaust enters filter unit 18.

Figure 5:
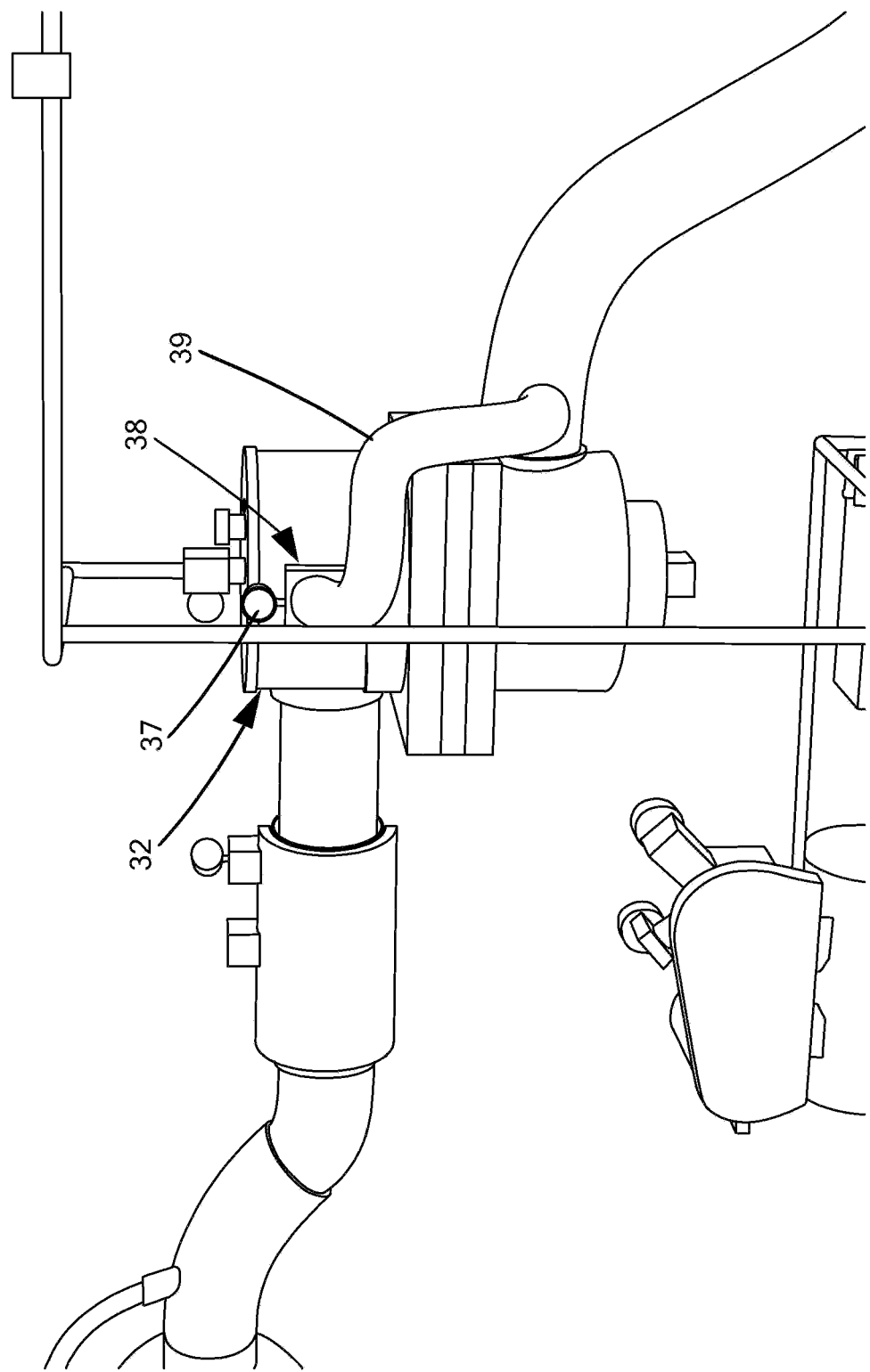
FIG. 5 is an enlarged rear perspective view of the shuttle mechanism and the filter device of the reactive-cyclic induction system of FIG. 2.

Referring now to FIG. 4, a pressurized filter unit 18 is provided in the present embodiment in order to remove secondary pollutants such as Sulfur Oxides ("SOx"), Hydrogen Carbons ("HC"), and Particulate Matter ("PM") from the exhaust. The exhaust enters a first enclosure 32 of filter unit 18 through hose 26. Likewise, pressurized air is pumped through an air pressure regulator 33 via air lines 34 into the first enclosure 32 and through a dispersal nozzle 36 supported by the first enclosure for circulation therein. The pressurized air then forces the exhaust containing pollutants through the one or more filters 40 and into a second enclosure 42. The one or more filters may be replaceable flow/pass through filters chosen to remove common pollutants found in diesel exhaust, including but not limiting, SOx, HC, and PM including soot, as would be known to those of skill in the art. Referring now to FIG. 5, first enclosure 32 also supports a pressure monitor 37 and gate valve 38 attached to hose 39 that acts as a bypass mechanism for the exhaust in case the one or more filters 40 become clogged. This bypass mechanism aids in preventing engine manifold back pressure.

Referring again to FIG. 4, a trap 44 may additionally be supported by enclosure 42 to catch any debris not cleared out by the one or more filters 40. For maintenance of the pressurized filter unit 18, periodic flushing may be desirable. In order to flush the pressurized filter unit 18, including the first and second enclosures 32, 42 and filters 40, freshwater may be introduced through an inlet 44 having a fitting for receiving a hose, for example a conventional garden hose, and expelled through outlet 46. Once the exhaust has passed through the pressurized filter unit 18 and the secondary pollutants have been reduced, it passes through hose 48 connected at a first end to the second enclosure 42 and at a second, opposing end to tank 50 of induction apparatus 20.

Figure 6:
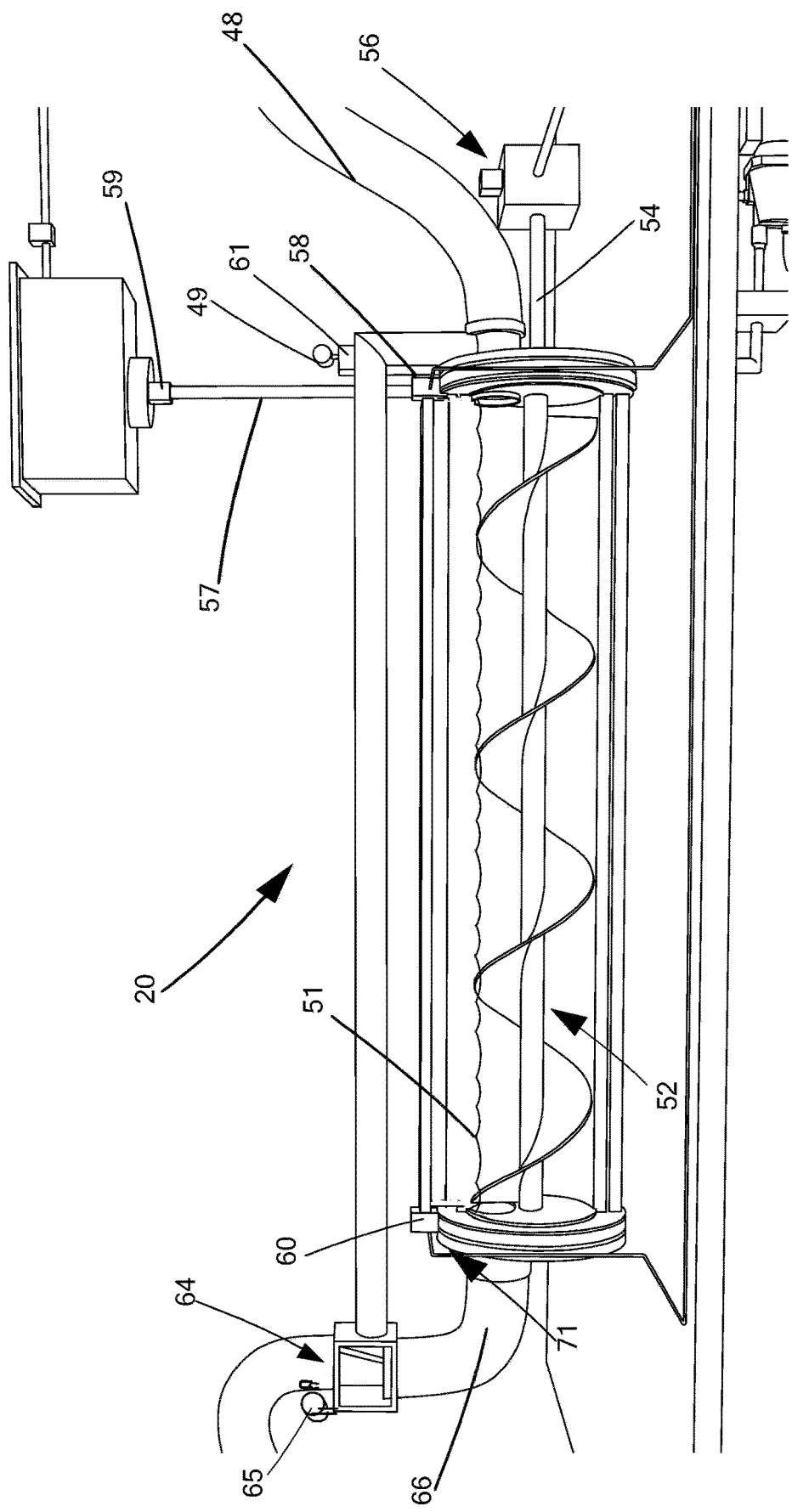
FIG. 6 is an enlarged front perspective view an alternate embodiment of the induction apparatus including an electrolyzer having an anode and cathode for the reactive-cyclic induction system of FIG. 2.

As best shown in FIG. 6, in addition to tank 50, induction apparatus 20 also includes mixing component 52 supported by the tank, which operates to mix saltwater 51 with the exhaust. Because tank 50 is filled with saltwater it is watertight, except for the water entering and leaving the system through pipes, such as feed pipe 53 (FIG. 8) that is used to fill the tank, bypass recirculating pipe 55 to recirculate the mixture of seawater and exhaust through the tank until such time as the NOx emission is sufficiently reduced, and saltwater reserve feed pipe 57. The saltwater reserve feed pipe 57 is for adding salt in brackish and low sodium chloride seawater areas (bays, rivers, etc.) into the tank 50 from the sodium chloride reserve tank 22, as described below.

In the embodiment of FIG. 6, mixing component 52 is a rotating screw style helix that is turned by shaft 54, which is driven by a motor 56 that turns the helix at relative low number of revolutions per minute "rpms," for example between approximately 100-200 rpms. It is contemplated that other types of mixing components 52 may readily be utilized, including static mixing that does not have a moving/motorized component, provided that it sufficiently blends the exhaust with the saltwater, as would be known to those of skill in the art. Upon blending the exhaust with the saltwater a molecular reaction to break down Nitrogen Oxide into Nitrogen is produced. In order to create the molecular reaction a sufficient amount of sodium chloride must be utilized. To ensure the salt content is sufficient a PH meter 49 is provided to measure the sodium chloride in the seawater in tank 50.

Referring still to FIG. 6, an electric operated valve 59 in communication with feed pipe 57 opens when low salinity seawater is registered by PH meter 49. Air pressure valve 61 uses low air pressure to help move salt from feed pipe 57 into induction unit 50. This addition of sodium chloride aids the molecular reaction by ensuring that the levels of sodium are enough to break down the NOx emission even in brackish water. Likewise, a diverter valve 64 may also be provided to allow the exhaust/seawater mixture to recirculate and loop back through the induction unit 50 if the NOx emissions have not been sufficiently reduced to insure full cycle exposure. A gauge 65 may be utilized to determine the NOx emissions and signal the diverter valve to remain open as shown in FIG. 6 for discharge through pipe 66 overboard if the NOx emissions have been met, and to close so that the exhaust/seawater mixture is sent through recirculating pipe 55 if the NOx emissions have not been sufficiently reduced. Instead of recirculating through the same tank 50, multiple tanks may be utilized.

Figure 7:
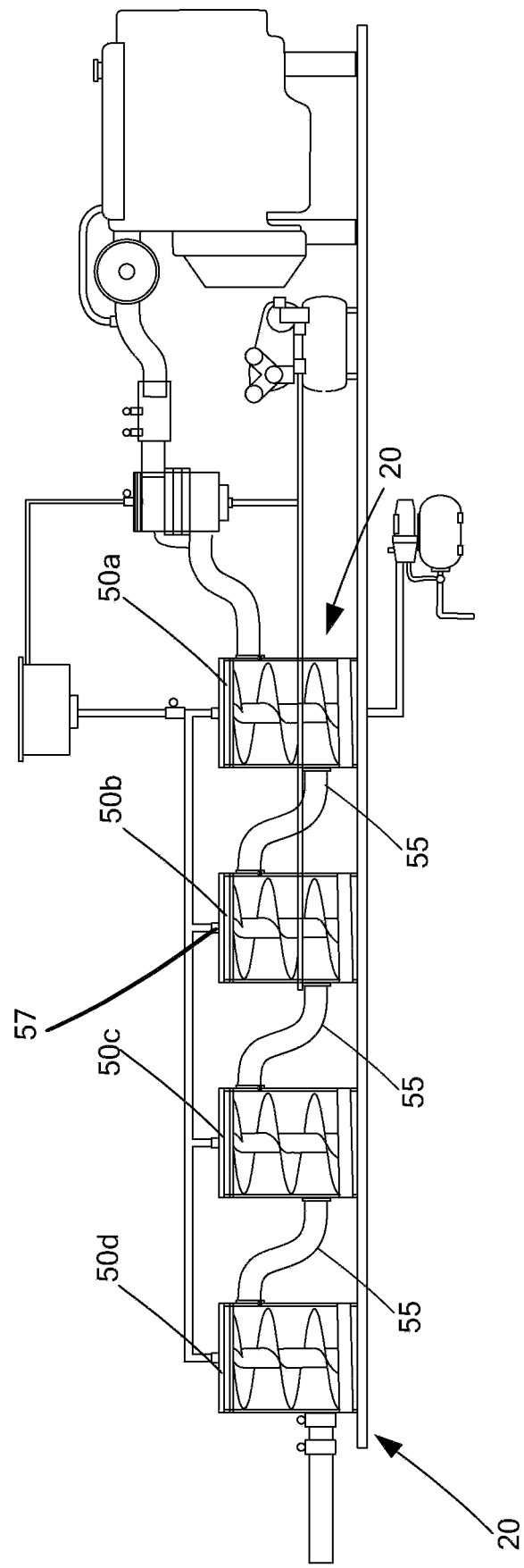
FIG. 7 is a schematic view of the modular reactive-cyclic induction system for breaking down Nitrogen Oxide into Nitrogen in accordance with a second embodiment.

As shown in the embodiment of FIG. 7, which is substantially the same in all aspects as the embodiment of FIG. 2 with the exception that multiple, vertical induction apparatus 20 are provided. The tanks are positioned such that the shaft of the mixing component 52 (i.e. an auger type screw in the present embodiment) is vertically disposed, while connecting the more than one tanks 50a, 50b, 50c, and 50d are recirculating pipes 55. The remaining components of FIG. 7 are substantially the same as of the embodiment of FIG. 2, except they may be multiples, in order to account for the multiple tanks. For example, there may be multiple feed pipes 57 provided as well as more than one PH meter 49 (not shown). Regardless of the number of induction apparatus 20, the combination of the seawater, air pressure and exhaust work together to create a molecular reaction to break down Nitrogen Oxide into Nitrogen. In order to increase the reactivity, electrolysis may be added to the system 10.

Referring again to FIG. 6, an alternate embodiment of induction apparatus 20 is illustrated. In this embodiment, induction apparatus 20 also includes an electrolysis accelerator 71. The embodiment of FIG. 6 is substantially the same in all aspects as the embodiment of FIG. 2 but additionally includes the electrolysis accelerator 71 that has a positive (anode) 58 and negative (cathode) 60 DC current created by battery 62, for example a 12/24v battery operated by an amperage controller 63, to generate electrolysis to accelerate molecular transformation of the NOx into NO. In creating the reaction, the seawater acts as the electrolyte. The cathode 60 may be made of a less noble, sacrificial metal such as zinc, while the anode 58 may be made of a metal such as copper or magnesium, or the like. If electrolysis is utilized for the molecular transformation of NOx into NO, it is also possible to utilize the induction apparatus 20 to reduce $CO_2$ from the exhaust.

Figure 8:
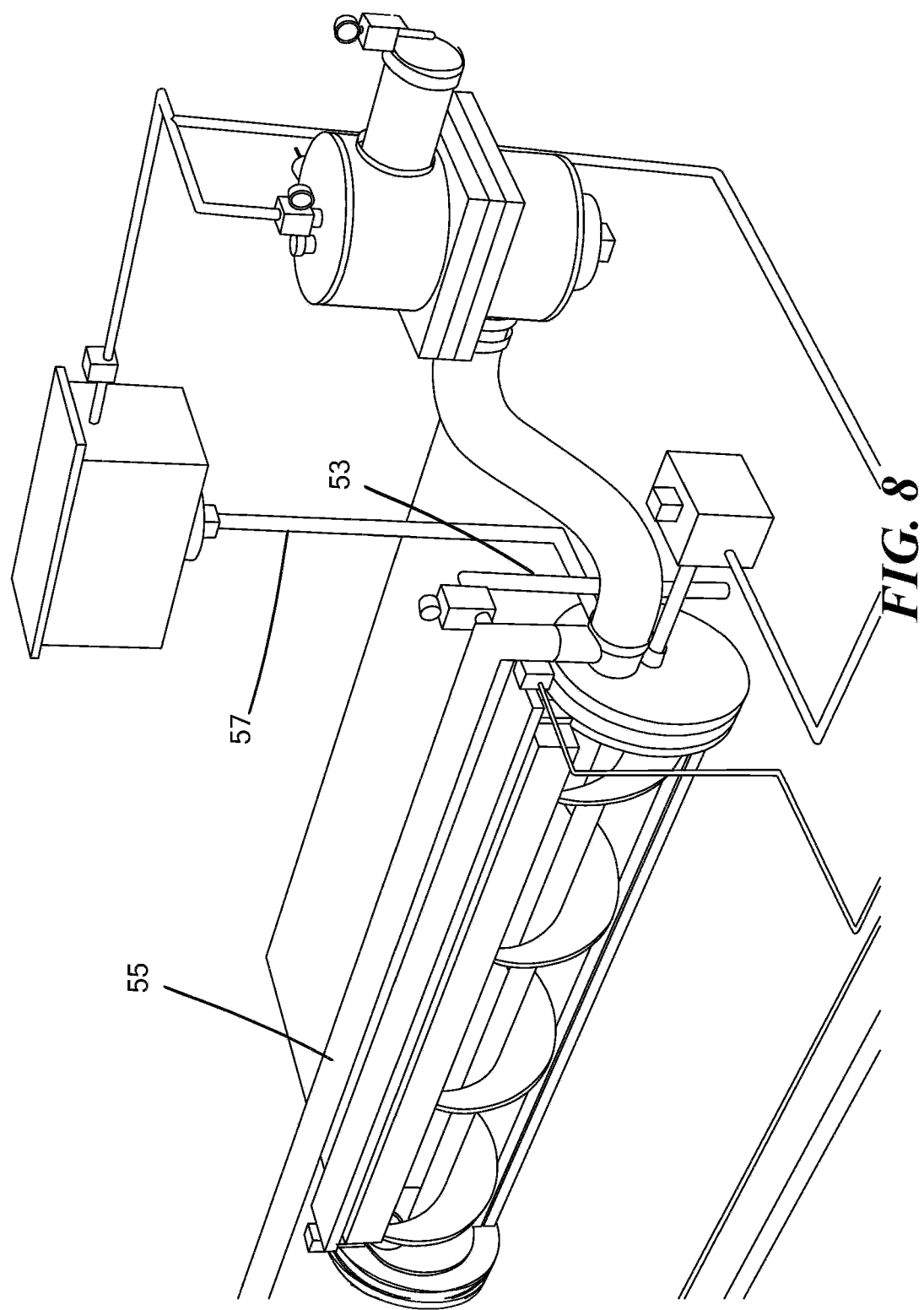
FIG. 8 is side perspective view of a third embodiment of a reactive-cyclic induction system including an induction apparatus having an electrolyzer with an anode and cathode for breaking down $CO_2$.
Figure 9:
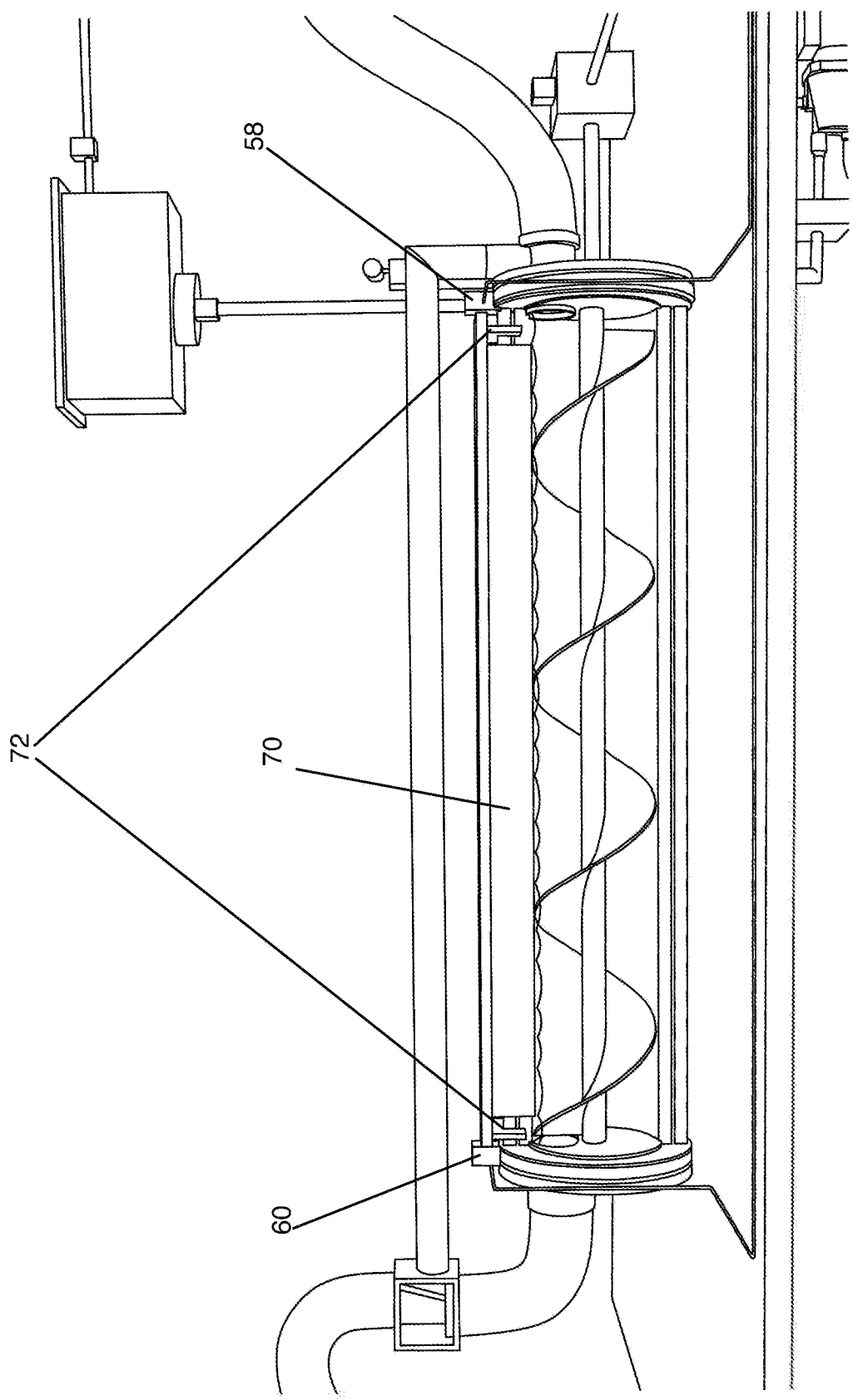
FIG. 9 is an enlarged front perspective view of the reactive-cyclic induction system including an electrolyzer of FIG. 8.

If the induction apparatus is utilized to reduce $CO_2$, in addition to the anode 58, cathode 60, and the seawater electrolyte, calcium oxide 70 in the form of lime may also be mixed with the seawater through which the $CO_2$ from the exhaust is passed, as shown in the embodiment of FIGS. 8-9. The embodiments of FIGS. 8-9 are substantially the same in all aspects as the embodiment of FIG. 6 but additionally include calcium oxide 70. The lime should be about 50% calcium in order to react with the $CO_2$ to form calcium bicarbonate that can be safely pumped overboard. Such lime is available as a compressed block, as would be known to those of skill in the art. Referring to FIG. 9, a block of lime 70 is secured by a mount 72 within tank 50 and in contact with the seawater 51. As the mixing component 52 rotates and churns the seawater, the lime 70 dissolves and is emulsified as it is distributed into the seawater. A float (not shown) may be provided within tank 50 in order to maintain a level of seawater sufficient to contact and dissolve the lime 70. Once the brick of lime is dissolved it may be replaced by simply opening the top of the tank 50 and mounting a new block.

Figure 10:
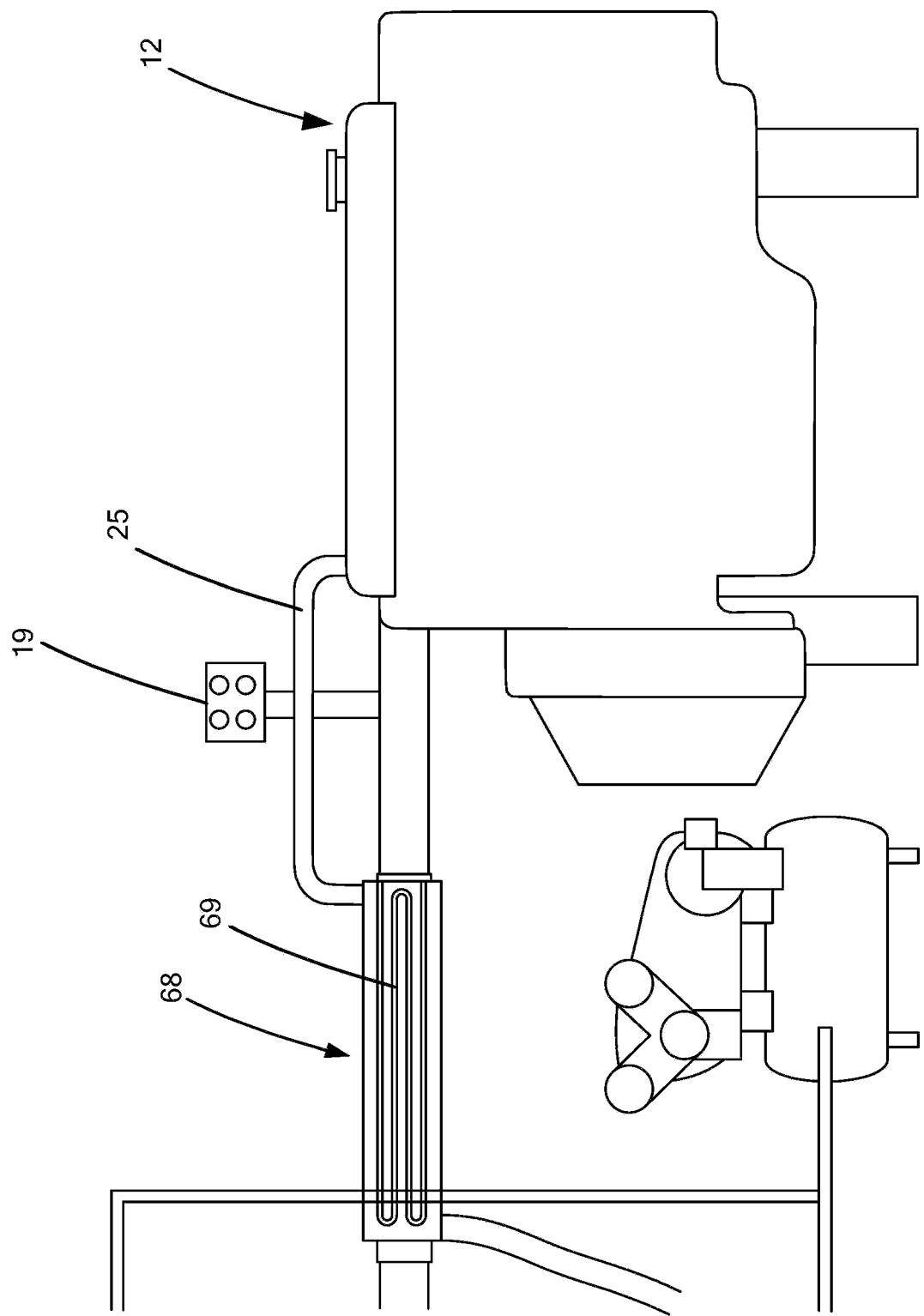
FIG. 10 is a schematic view of a fourth embodiment having a manifold connected to the marine engine of the reactive-cyclic induction system according to the present disclosure.
Figure 11:
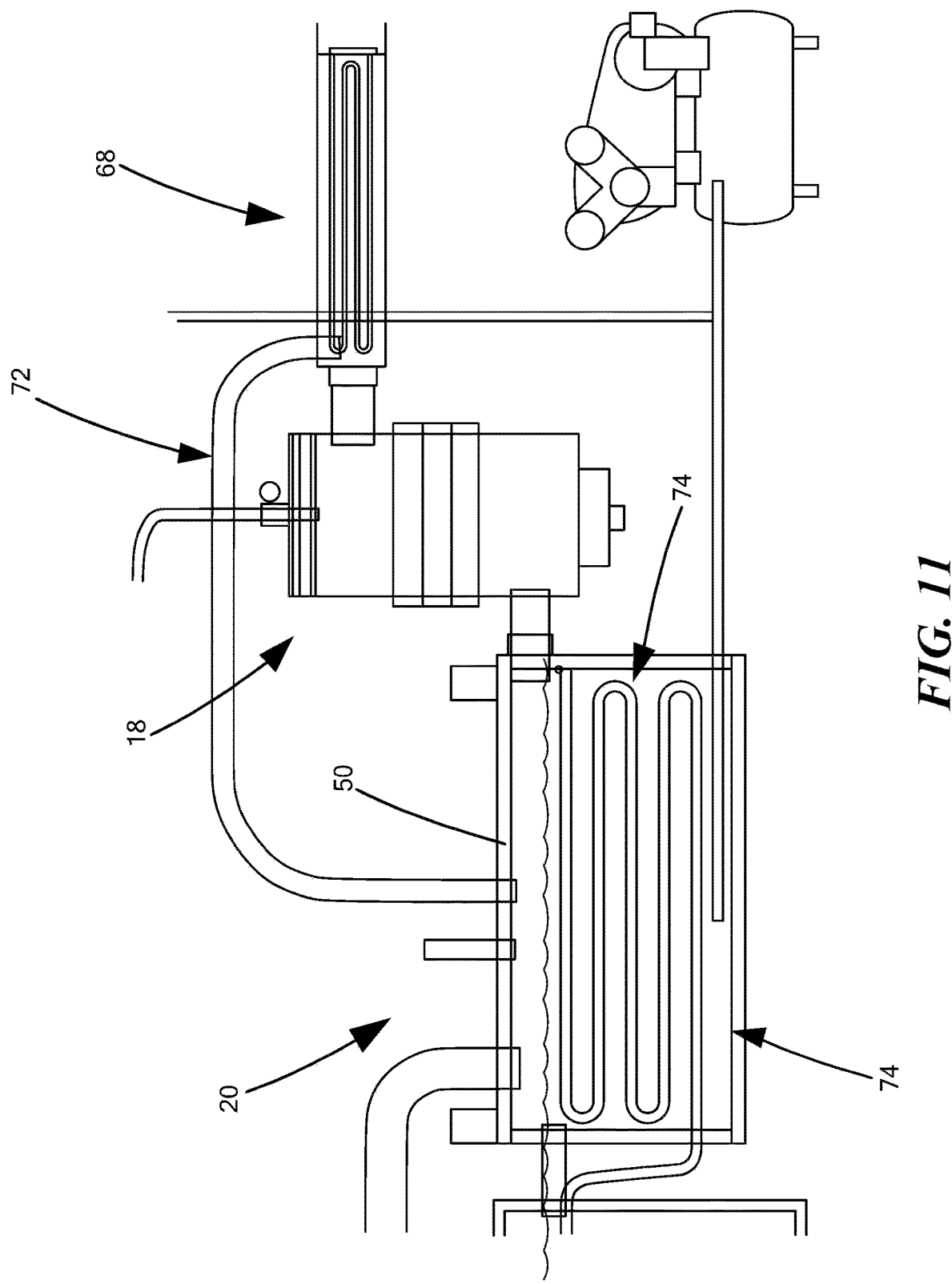
FIG. 11; is a schematic view the reactive-cyclic induction system of FIG. 10 illustrating the induction apparatus having an additional manifold.

Referring to FIGS. 10-11, an exhaust manifold 68 including at least one heating element 69 may be provided to heat the seawater that is discharged through tube 25 from the engine 12 to 216° F. in order to boil and create steam, to increase the temperature of the seawater above about 265° F. when in the induction apparatus 20 to enable the desired reaction. As shown in FIG. 11, the exhaust is directed from the manifold 68 into the pressurized filter unit 18, but the heated seawater is transferred via tube 72 directly to the tank 50 of the induction unit 20. Alternately, or in addition to an exhaust manifold 68, the induction apparatus itself may include a manifold 74 to heat the seawater circulating therein, whether for NOx or $CO_2$ reduction or both. By heating the seawater the reaction to turn the $CO_2$ into calcium bicarbonate is enhanced. Although illustrated as a single tank 50, multiple tanks may be utilized with some having lime and others being used just for reduction of NOx. The reduction of the emissions of $CO_2$ and NOx through the use of the induction apparatus, high pressure air, and electrolysis as described herein is above about 50% for $CO_2$ and about 75%-90% for NOx.

It will be appreciated that because the system disclosed herein utilizes various component parts that are connected by lines and hoses they have a mobile, modular configuration that can be adapted to the dimensions and configuration of the particular engine room. In addition, because the engine does not require modification and the system is not overly complex, existing as well as new vessels can benefit from the system at a lower cost than less effective alternatives. Finally, the system provides a method for reducing not only NOx but $CO_2$ pollutants as well, in a single system that can be utilized on ships that are not suited for other larger systems such as stacked scrubbing.

Those skilled in the art will appreciate that the conception, upon which this disclosure is based, may readily be utilized as a basis for designing other products without departing from the spirit and scope of the invention as defined by the appended claims. Therefore, the claims are not to be limited to the specific examples depicted herein. For example, the features of one example disclosed above can be used with the features of another example. Furthermore, various modifications and rearrangements of the parts may be made without departing from the spirit and scope of the underlying inventive concept. For example, the geometric configurations, size, number and positioning disclosed herein for the inductor, including the tank and mixing component, may be readily altered depending upon the application. Thus, the details of these components as set forth in the above-described examples, should not limit the scope of the claims.

Additionally, the purpose of the Abstract is to enable the U. S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

What is claimed is:

1. A system for reducing pollutants from marine exhaust comprising:
    a hose including a first end configured and dimensioned to connect to the exhaust of a marine diesel engine and a second end opposite the first end;
    a plurality of air lines configured and dimensioned to deliver compressed air therethrough;
    an air compressor operatively connected to one or more of the plurality of airlines;
    an air pressurized filter unit including a first enclosure constructed and arranged to receive the second end of the hose, and including a cavity through which pressurized air is injected forcing the exhaust to flow through one or more filters constructed and arranged to filter out one or more pollutants;
    an inlet tube configured to draw seawater from the sea and operatively connected to one or more water lines;

a pump constructed and arranged to pump the seawater through the one or more water lines;

an induction apparatus including a tank configured and dimensioned to hold seawater and supporting a mixing component constructed and arranged to mix the seawater with the exhaust, the induction apparatus being operatively connected to the air pressurized filter unit;

and wherein during use the marine exhaust is routed through the system by the compressed air and is received within both the air pressurized filter unit to remove a first set of pollutants selected from the group consisting of Sulfur Oxides, Hydrogen Carbons, and Particulate Matter, and is received within the induction unit to remove a second set of pollutants including NOx.

2. The system of claim 1, further comprising a shuttle mechanism including a valve movable between a closed position and an open position, and wherein the hose is operatively connected to the shuttle mechanism.

3. The system of claim 2, further comprising a pressure monitor that monitors the air pressure in the system, wherein when the pressure from the exhaust of the engine reaches a sufficient level the valve opens and when the pressure is below a certain acceptable level the pressure monitor signals the valve to close.

4. The system of claim 1, further comprising an exhaust manifold including a heating coil constructed and arranged to receive the exhaust and engine seawater, and wherein the exhaust manifold heats the seawater that is circulated through the manifold.

5. The system of claim 4, wherein the exhaust is directed from the exhaust manifold into the pressurized filter unit, while the heated seawater is transferred directly into the tank of the induction unit.

6. The system of claim 4, wherein the induction apparatus further comprises a manifold including a heating coil to provide additional heating to the seawater circulating therein.

7. The system of claim 4, further comprising an electrolysis accelerator including a positive anode, a negative cathode and a battery for creating a DC current to accelerate the removal of NOx when the exhaust is received within the induction unit.

8. The system of claim 7, wherein the second set of pollutants includes $CO_2$ and the induction unit further includes calcium oxide supported within the tank, wherein as the seawater is churned within the tank it contacts and dissolves the calcium oxide into the seawater in order to convert $CO_2$ into calcium bicarbonate.

9. The system of claim 8, wherein the calcium oxide is in the form of lime comprising about 50% calcium.

10. The system of claim 1, further comprising a diverter valve movable between an open and a closed position and positioned within a discharge tube, wherein in the open position the mixture of seawater and exhausted is discharged out of the ship and in the closed position the mixture is recirculated through a recirculation pipe constructed and arranged to recirculate and loop back through the induction unit when NOx emissions have not been sufficiently reduced.

11. The system of claim 10, further comprising a gauge constructed and arranged to measure the NOx emissions of the seawater and exhaust mixture within the induction unit and signal the diverter valve to remain open to discharge the mixture if the NOx emissions have been met, and to close the diverter valve to recirculate the mixture through recirculating pipe if the NOx emissions have not been sufficiently reduced.

12. The system of claim 10, further comprising additional induction units and wherein the mixture of seawater and exhaust are recirculated through the additional induction units by the recirculation pipe.

13. The system of claim 1, further comprising a sodium chloride reserve tank and a saltwater reserve feed pipe constructed and arranged to add salt into the tank of the induction unit in brackish and low sodium chloride seawater areas.

14. The system of claim 1, wherein the mixing component comprises a rotating screw helix turned by a shaft driven by a motor.

15. A system for reducing pollutants from marine exhaust comprising:

a hose including a first end configured and dimensioned to connect to the exhaust of a marine diesel engine and a second end opposite the first end;

an exhaust manifold including a heating coil constructed and arranged to receive the exhaust and engine seawater from the hose, and wherein the exhaust manifold heats the seawater that is circulated through the manifold;

an inlet tube configured to draw seawater from the sea and operatively connected to one or more water lines;

a pump constructed and arranged to pump the seawater through the one or more water lines;

an induction apparatus including a tank configured and dimensioned to hold seawater and a mixing component constructed and arranged to mix the seawater with the exhaust received within the tank from a second hose; and wherein during use the heated seawater is transferred from the exhaust manifold into the tank of the induction unit and the marine exhaust is received within the induction unit from a separate hose and mixed with the heated seawater to remove a set of pollutants including NOx.

16. The system of claim 15, further comprising an electrolysis accelerator including a positive anode, a negative cathode and a battery for creating a DC current to accelerate the removal of NOx when the exhaust is received within the induction unit.

17. The system of claim 16, wherein the induction unit further includes calcium oxide supported within the tank, wherein as the seawater is churned within the tank it contacts and dissolves the calcium oxide into the seawater to convert $CO_2$ into calcium bicarbonate.

18. The system of claim 17, wherein the calcium oxide is in the form of lime comprising about 50% calcium.

19. The system of claim 15, further comprising:

a plurality of air lines configured and dimensioned to deliver compressed air through the system;

an air compressor operatively connected to one or more of the plurality of airlines; and an air pressurized filter unit including a first enclosure constructed and arranged to receive the marine exhaust from the exhaust manifold, and including a cavity through which pressurized air is injected forcing the exhaust to flow through one or more filters constructed and arranged to filter out one or more pollutants prior to the marine exhaust entering the tank of the induction apparatus.

20. The system of claim 15, further comprising a sodium chloride reserve tank and a saltwater reserve feed pipe constructed and arranged to add salt into the tank of the induction unit in brackish and low sodium chloride seawater areas.

21. The system of claim 15, wherein the mixing component comprises a rotating screw helix turned by a shaft driven by a motor.

\* \* \* \* \*